May 26, 1970 W. F. WILLIAMS 3,514,764

MEMORY SWITCHING DEVICE

Filed Jan. 12, 1968

INVENTOR.
WINSTON F. WILLIAMS

BY Richard W. Anderson

AGENT

1

3,514,764
MEMORY SWITCHING DEVICE
Winston F. Williams, Cedar Rapids, Iowa, assignor to Collins Radio Company, Cedar Rapids, Iowa, a corporation
Filed Jan. 12, 1968, Ser. No. 697,485
Int. Cl. G11c 11/50
U.S. Cl. 340—173 3 Claims

ABSTRACT OF THE DISCLOSURE

A logic switching system for presetting a row of switches in preselected permutations comprised of a number of plate members carried in space separated relationship on a flexible endless tape means. Each plate carries a row of switch activating pins which may be turned in or out to selectively activate switches when the plate is positioned in cooperative relationship with the switch row. The plates are cross sectioned and so spaced as to cooperate with sprocket drive and support members. The switches are mounted within the confines of the endless tape means and permit operator front panel access for pin adjustments of the row of pins which is in operative position with the switch row.

This invention relates generally to switching devices and more particularly to a type of memory switching device which may be utilized in binary control circuitry. Systems of a general type relating to this invention employ a bank of switches in conjunction with switch activating pin members which engage and activate certain permutations of the switches to set up a binary code—as by grounding certain ones of a plurality of associated lines through activated switches in the bank. Various switching schemes employing binary code are currently used in the art such as the known BCD ground logic system.

Control switching devices often must incorporate a large number of switches; for example, a number of groups of BCD logic switching systems may be employed to effect tuning functions for each channel of a radio. In addition, such systems often incorporate a large number of channels.

Known devices employ a drum, having placed on the periphery thereof a number of rows of switch activating pins—one row for each preselected channel to be coded. Each of the switch activating pins, in turn, is positionable along the longitudinal axis of the drum to one of two or more positions so as to either engage or disengage a switch arm. The length of the drum is therefore determined by the number of switches to be employed in the control system for a given channel, and longitudinal length must be reserved for the requirement that each of the pins must translate longitudinally from an active position to an inactive position. Further, the number of channels employed defines the number of rows of pins and thus the diameter of the drum.

For a given drum diameter, there is a mechanical limitation as to the closeness of the row spacing and further, as to row requirement (one row for each channel to be controlled), there is an obvious limitation as to the diameter of the drum since control boxes in general are designed to be as compact as possible and more often the design engineer is confronted with a given volumetric requirement into which he must place the control circuitry according to a given specification. Large diameter drums are therefore undesirable and ofttimes prohibitive.

Switching drums employed in the art cooperate with the bank of switches such that the pin members engage the switch activating arm at a point which is necessarily removed from the observation window through which the operator may make pin position settings to set in the switching logic. Thus, generally, when the operator is setting up the pin positions for control of, for example, channel 16, he must position the drum to select, for example, channel 6, in the channel selecting viewing window. In other words, the operator must manually position the drum to some channel other than the one for which he wishes to make pin position adjustments. This necessitates a chart to correlate the numbers of channels actually selected with those for which pin access is realized. The loss or obscurement of such alignment correlation data may result in confusion and, at best, confronts the operator with an unnatural arrangement.

The present invention provides a means of improving control switching devices in a manner to overcome the above discussed disadvantages of currently used drum devices. It is an object of the present invention to permit within a given volumetric enclosure a control switching device employing pin activated switch banks wherein the number of channels may be considerably increased by replacing the conventional drum with a track comprised of "tread-like" plates carried by an endless tape member such that the drum diameter limitation is removed.

The invention is accordingly featured in the conversion, so to speak, of the surface of a memory drum into an endless track formed out of a plurality of strips each carrying a row of channel control pins—one such strip for each channel to be controlled.

A further feature of the invention is the provision of selecting a channel strip cross section which conforms in a cog-like manner with positioning cog wheels, either driving or idler in fashion, such that the control track may be formed as necessary to fit in a given volumetric enclosure.

A further object of the present invention is to provide a memory switching device of a type employing pin activated switch banks wherein the length requirement of the members carrying the pins is essentially halved by employing pin positioning the first and second (activating and non-activating) positions by transverse adjustment with respect to the plane of the member in which they are carried, rather than by longitudinal displacement to first or second positions as in known devices. Transverse pin adjustment permits placing the switch bank within the confines of the "track" and permits a simple channel identification system and channel pin code selection system by allowing operator access to the pins associated with the selected channels.

These and other objects and features of the present invention will become apparent upon reading the following description in conjunction with the accompanying drawings in which.

As above discussed, the present invention relates to the art of remote or automatic tuning of radio apparatus. The device to be described is similar in function to existing memory drum channel selection devices by means of which a number of switches may be activated in various permutations to define discrete binary information which may be utilized in a remote device such as a radio to accomplish various tuning functions. The switches are arranged in a bank and cooperate with a like plurality of pin activating members selected ones of which may be positioned into operative engagement with an associated switch.

The present invention is particularly useful for incorporation in a control box which might be panel mounted in an aircraft, for example, and thus space requirements are extremely minimized both as concerns the volume of the device and the front panel size. As above discussed, the use of a drum carrying a plurality of rows of switch activated pins becomes a problem when a great number of preselected channels (and thus rows) are to be considered. The size of the drum both as to the drum length and the drum diameter may become prohibitive in nature. The present invention essentially "converts" the surface of the drum to an endless track, the ultimate configuration of which may vary to fit the design requirement. The use of an endless track carrying rows of switch activating pins on individual plate members allows a great deal of flexibility as concerns incorporation in a given size box; and as will be further described, uniquely permits front panel access to that particular row of pins concerned with a given channel, and simplifies the set-up procedure.

The known drum switching devices necessitate the placement of the switch bank adjacent to the periphery of the drum and, of course, external of the drum surface since the drum is to rotate. Due to numerous design problems, the inside area of the drum used is essentially wasted space. The present invention uniquely permits the switch bank to be placed inside the "drum," it being realized that the drum will now be converted to an endless track, the surface area of which would approximate the area of a drum effecting tuning control of a like number of preselected channels. Actually, it will be shown that the surface area of the pin carrying means is essentially only one-half that which would be required with known drum arrangements.

Figure 1:
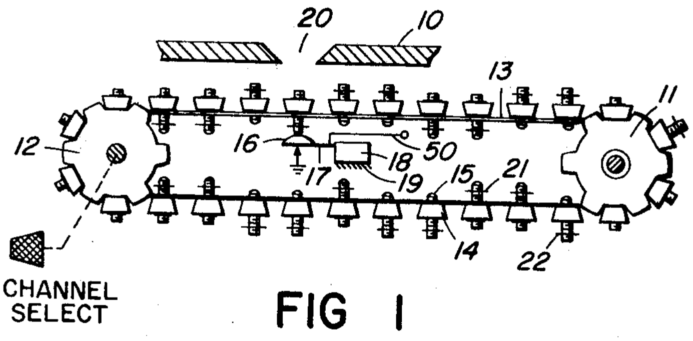
FIG. 1 is a cross sectional view of a memory switching device in accordance with the present invention.
Figure 2:
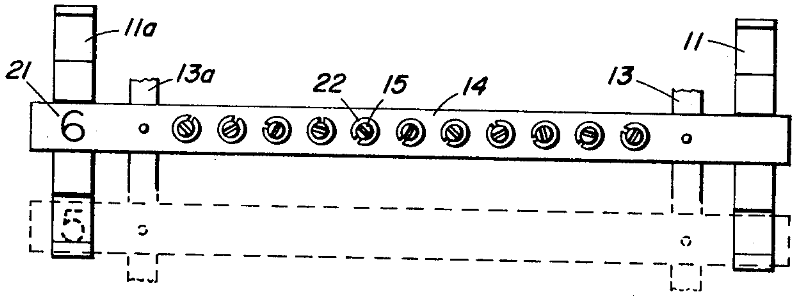
FIG. 2 is a lateral view of a single pin carrying strip.
Figure 3:
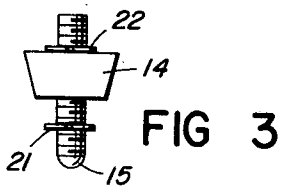
FIG. 3 is a cross sectional view of a pin carrying strip.

The device, as shown basically in FIG. 1, illustrates a section of a control box front panel 10 into which is placed a viewing window or cut-out 20 to permit access to and positioning of the pins associated with a selected channel. With reference to FIG. 2 each row of switch activating pins 15 is carried on a plate member 14. FIG. 2 illustrates nine such pins as an example. The pin positions may be preselected to effect a given permutation of activated ones of a cooperating bank of switches. Each of the plate members 14 is affixed to an endless steel tape at each end so that, as illustrated in FIG. 1, the plate member 14 forms an endless track or "tread." FIGS. 1 and 3 illustrate the cross section of the pin carrying plates 14 as being trapezoidal in nature such that the cross section of the plates 14 and the spacing between may be designed to cooperate with sprocket members such as 11 and 12 in FIG. 1. One of the sprocket members may then be rotatably positioned while the other of the sprocket members acts as an idler such that a particular one of the pin carrying members 14 may be positioned to cooperate with the switch bank and also be positioned for access through the opening 20 in the panel 10.

With reference to FIG. 1, a given row of pins is seen to be in cooperative position with an engaging projection 16 on the arm 17 of a switch 18. FIG. 1 functionally illustrates the switch 18 as being rigidly affixed to the mounting. While FIG. 1 illustrates a single switch 18 in conjunction with a cooperating pin, it is to be understood that, in the example set forth, a bank of nine switches would be included, each switch having an arm 17 with an end member 16 in cooperative relationship with one of the pins 15. The switching permutation effected by the selection of a given channel may then be preselected by selectively positioning each of the pins 15 to either project inwardly towards the switch arms to activate the switch, or alternatively, be withdrawn outwardly into a position which will not activate the cooperating switch. FIG. 1 illustrates a cooperating pin protruding inwardly to activate switch 18. In the example shown, the switch 18, when activated, grounds an associated control wire 50 and thus the switching logic would be a preselected permutation of grounded or ungrounded control wires which would be utilized in logic switching circuitry to effect shaft positioning, tuning, etc.

Figure 4:
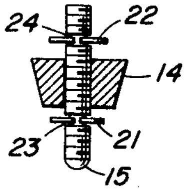
FIG. 4 is a mechanical detail illustrating the pin positioning arrangement of the present invention.

FIG. 4 illustrates a detail of the pin members 15 adjustably mounted in the plate member 14. Each of the pins 15 might comprise a central portion in threaded engagement with the plate 14 such that rotation of the pin will cause the end of the pin to either protrude inwardly towards the cooperating switching arm member or be backed away from contact with the switch arm member. The pin members 15 might be formed with first and second annular slots 23 and 24 into which are placed washer members 21 and 22 to define position limits of the pins 15 within the plate 14. Thus, each of the pins 15, through the access 20 in the panel 10, may be turned fully "in" or fully "out" so as to either be in an engageable position with the cooperating switch or not, as desired. It is noted that this arrangement allows operator access for setting the pins for the actual channel selected. The pins being adjusted are those actually in cooperative position with the switch bank. FIG. 2 illustrates the simple manner in which any given channel may be identified by placing on the end of each plate member 14 a single channel identification number or other inscription which provides full identification for both channel selection and for setting pin positions as well. It should be pointed out that the known drum devices for effecting channel preselection in the manner of this invention likewise require front panel access to the rows of pins so that each channel may be set up as desired by the operator. Since the cooperating switch in bank in the drum arrangement must be external to the surface of the drum, it follows that the switch bank must be cooperating with a different row of pins from that accessible to the operator through the front panel. Thus, in the known arrangements the operator must position the drum for a channel selection which does not correspond to the channel controlled by the accessible pin row. Thus, known devices must carry a correlation table to tell the operator that if he wishes to have access to and set the pins for channel 6 he must turn the drum to some other channel indication, such as channel 12. The instant invention obviates this particular problem in that the operator always has access to the row of pins associated with the selected channel.

A further unique advantage of the present invention is the correlation between the pin settings and standard binary number indications. Since each of the pins is positioned "in" or "out," a direct correlation exists in that "in" corresponds to a binary "1" and "out" corresponds to a binary "0."

Figure 5:
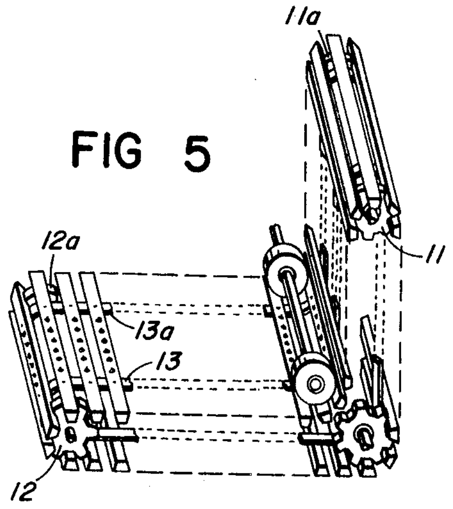
FIG. 5 is a view of the control track illustrating the versatility of control track mounting configuration within a given confine.

FIG. 5 illustrates the manner in which the "track" formed by the plurality of pin carrying plate members 14 may, by the use of appropriate idler sprockets, be made to conform to a number of space requirements. As illustrated in FIG. 5, the track, through the incorporation of idler sprockets, may be formed into an L shape if desired or necessitated. Obviously, by use of appropriate idlers, the track may be literally wound around itself or serpentined. The limitation imposed by the drum diameter in known devices, is thus removed, and it is readily seen that the device will permit control or preselection of a vastly greater number of channels for a given space allocation than would be employment of known drum arrangements. Further, when space requirements are stringent, it is seen that the present device permits a more effective utilization of the space by permitting the switch bank to be placed "inside" the track—the ends of the track being open and permitting the control wires from the switches to be carried without interference with the mechanism of the switch activating pin arrangement. The difficulties of carrying the control wires from a bank of switches placed within the confines of a rotating drum member is obvious.

The present invention is thus seen to provide a memory switching device offering considerably more design flexibility, more efficient utilization of space, and a more efficient and direct means for setting the desired switch permutation to be effected for each selected channel.

Although the present invention has been described with respect to a particular embodiment thereof it is not to be so limited as changes might be made therein which fall within the scope of the invention as defined by the appended claims.

I claim:

1. Apparatus for presetting a plurality of control switches comprising a plurality of longitudinally extending plate members, said plate members affixed in space separated paralleled relationship on a flexible endless transport means, said plate members being carried in a continuous loop configuration in cooperative engagement with a plurality of sprocket wheels, each of said sprocket wheels having a tooth configuration about the periphery thereof, each of said plate members having a predetermined cross section configuration and being spaced one from another by a predetermined distance such that adjacent ones of said plates conform in a mating arrangement with the tooth configuration of said sprocket wheels, a row of pin members carried by each of said plate members, each of said pin members extending through the associated plate member and displaceable transversely with respect to the plane of said plate member, a plurality of said control switches arranged in a bank carried within the confines of the continuous loop defined by said transport means, each of said control switches including a control arm arranged in cooperative relationship with one of said pin members in each of said plates, means for selectively adjusting the position of each pin member with respect to the associated plate into operative engagement with the associated one of said switch actuating arms, said last named means comprising a mounting means to which said bank of control switches is rigidly affixed, said mounting means having associated therewith a panel member into which is formed an access through-slot through which those ends of said pin members opposite those in cooperative relationship with the control arms of said bank of control switches are accessible, and means for rotatably driving at least one of said sprocket members to position selected ones of said rows of pin members into cooperative engagement with said bank of control switches.

2. Apparatus as defined in claim 1 wherein each of said plate members carries on the accessible surface thereof a channel identification number viewable through window means in said panel member.

3. Apparatus as defined in claim 1 wherein said plate members are formed with a trapezoidal cross section, said sprocket wheel teeth being formed to cooperate with the successive trapezoidal tooth cross sections upon being rotated, whereby predetermined annular rotation increments of a driving one of said sprocket wheels translates successive ones of said pin carrying plate members into cooperating relationship with said bank of control switches.

References Cited

UNITED STATES PATENTS

| | | | |
|---|---|---|---|
| 2,334,145 | 11/1943 | Colman | 178—17.5 |
| 2,661,091 | 12/1953 | Maloney | 209—121 |
| 3,156,900 | 11/1964 | Mumma | 340—173 |

TERRELL W. FEARS, Primary Examiner

U.S. Cl. X.R.

226—75